March 26, 1968 — J. M. STEINKE — 3,374,869

CAM OPERATED REVERSIBLE CLUTCH MECHANISM

Filed Sept. 2, 1966 — 3 Sheets-Sheet 1

INVENTOR
JAMES M. STEINKE
BY
HIS ATTORNEYS

March 26, 1968 J. M. STEINKE 3,374,869
CAM OPERATED REVERSIBLE CLUTCH MECHANISM
Filed Sept. 2, 1966 3 Sheets-Sheet 2

INVENTOR
JAMES M. STEINKE
BY
HIS ATTORNEYS

March 26, 1968  J. M. STEINKE  3,374,869
CAM OPERATED REVERSIBLE CLUTCH MECHANISM
Filed Sept. 2, 1966  3 Sheets-Sheet 3
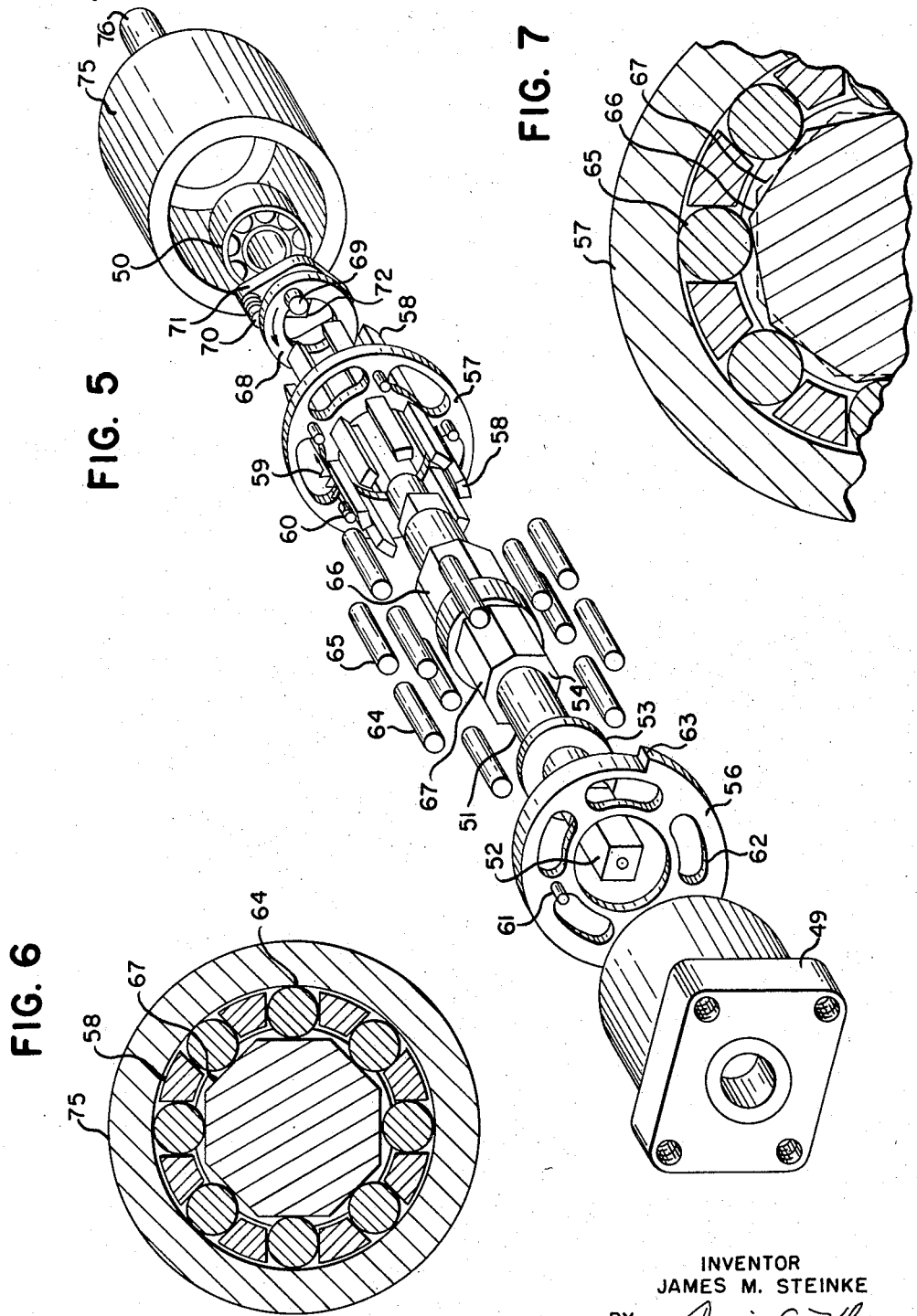
INVENTOR
JAMES M. STEINKE
BY
HIS ATTORNEYS

United States Patent Office 3,374,869
Patented Mar. 26, 1968

3,374,869
CAM OPERATED REVERSIBLE CLUTCH MECHANISM
James M. Steinke, Dayton, Ohio, assignor to The National Cash Register Company, Dayton, Ohio, a corporation of Maryland
Filed Sept. 2, 1966, Ser. No. 576,948
9 Claims. (Cl. 192—26)

ABSTRACT OF THE DISCLOSURE

A reversible clutch mechanism including an output shaft mounted within a driving member and a driven or brake member. A first set of cam members are mounted between the driving member and the output shaft with a second set of cam members mounted between the output shaft and the driven or brake member, corresponding cam members of both sets being interconnected for simultaneous movement. A control member operated externally of the clutch mechanism engages the interconnecting means to move one or the other set of cam members into an engaging position so that the output shaft is either driven or stopped. One embodiment of the clutch mechanism has wedged shaped cam members while a second embodiment has roller shaped cam members.

---

This invention relates to friction clutches and brakes and more particularly to a friction clutch and brake of the type wherein cam members are alternately wedged between the driven member and the driving member of the clutch, to apply a driving torque from the driving member to the driven member, and between the driven member and a second member to apply either a braking action or a reversed torque to the driven member.

An object of this invention is to provide a new and improved mechanical clutch of the cam type capable of a high-speed cyclic operation.

Another object of this invention is to provide a simplified mechanical asynchronous clutch-brake device capable of being controlled by application of a small external force.

A further object of this invention is to provide a controlled clutch-brake or reversing mechanical device of inherent high natural frequency capabilities.

Another object of this invention is to provide a controlled mechanical clutch or reversing mechanism with a significantly reduced phase lag between the input member and the output member and whose output torque, when disengaged, is not reflected back into the input member.

In accordance with this invention, there is disclosed a clutch comprising a driving member and either a stationary member or a reversing member, an output shaft positioned within both of said members, two sets of interconnected cam members positioned between both of said members and said output shaft, and a control member engaging each of said sets of cam members, so that, when the control member is actuated to a first position, one set of cams is engaged between the driving member and the output shaft, while the other set is in a free state. When the control member is moved to a second position, one set of cams is engaged between the stationary or reversing member and the output shaft, thereby halting or reversing the rotation of the shaft, while the other set of cams is moved to a free state. In this latter condition, the clutch acts either as a brake or as a reversing mechanism, depending on the type of member utilized.

In one form of embodiment, the cams are of a wedge shape, each set having cam surfaces so positioned that, when one set of cams is moved to an engaging position by operation of the control member, the other set of cams is in a disengaged position. In another form of embodiment, the cam members comprise two sets of rollers so mounted that, when both sets are moved in one direction, one set of rollers is in an engaging position while the other set of rollers is in a free, or non-engaging, position. Included in each embodiment is means which normally urges one set of cams into engagement between the driving member and the output shaft, thus putting the clutch in a normal driving state.

With the above and other, incidental, objects in view, the invention includes certain novel features of construction and combinations of parts, a preferred form or embodiment of which is hereinafter described with reference to the drawings which accompany and form a part of this specification.

In said drawings:

FIG. 5 is an exploded assembly view of a second embodiment of this invention.

FIG. 6 is a sectional view taken through the drive rollers of the embodiment of FIG. 5, showing the front drive rollers in an intermediate condition with relation to the output shaft.

FIG. 7 is a partial sectional view similar to that of FIG. 6, showing the front drive rollers wedged between the rotating shell and the output drive shaft to drive the output shaft.

Figure 1:
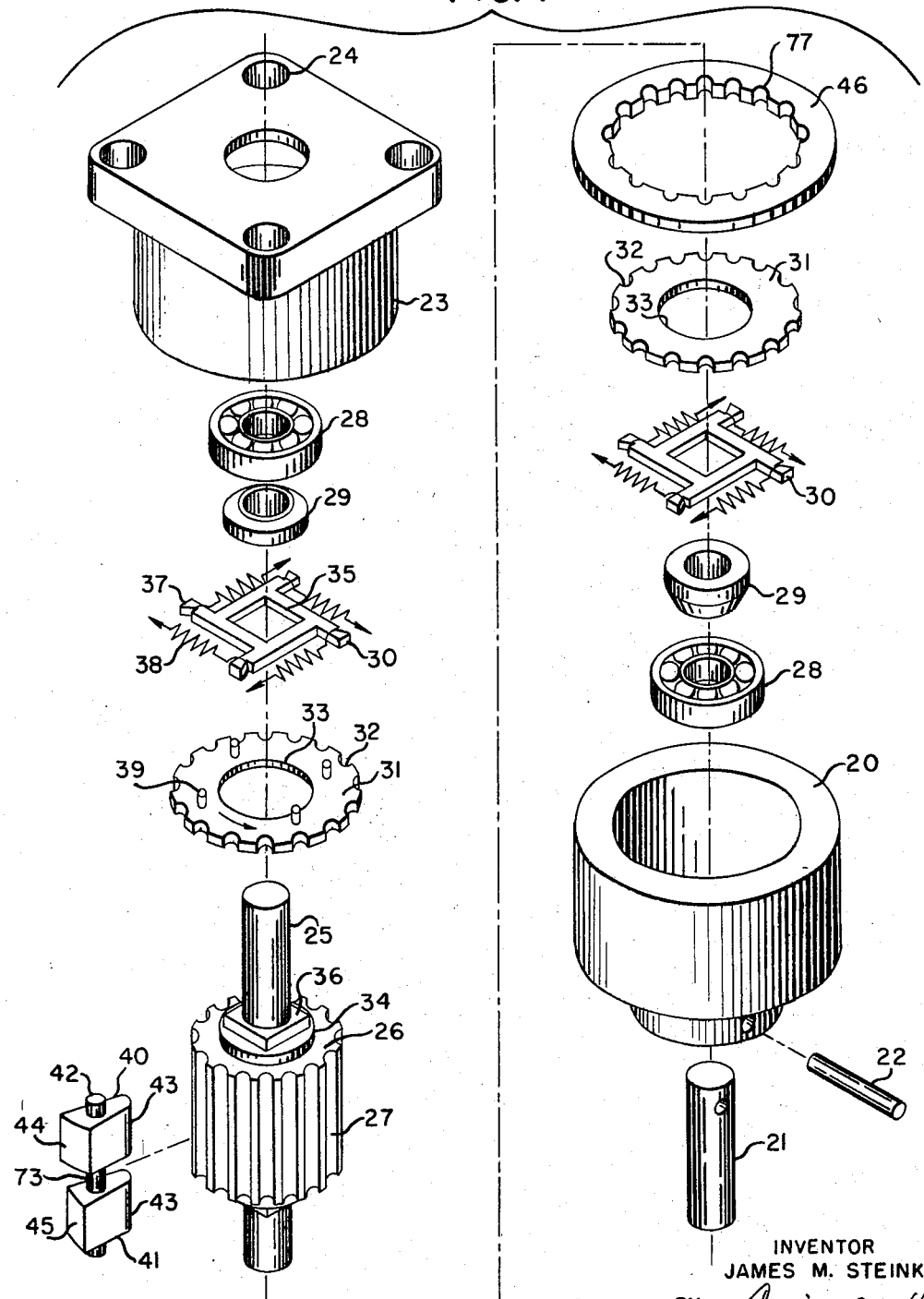
FIG. 1 is an exploded assembly view of one embodiment of the invention.

Referring now to FIG. 1, there is shown one embodiment of the present invention, which includes a rotating shell 20 secured to a rotating input shaft 21 by a pin 22. The rotational center of the shell 20 is in line with a stationary shell 23, having the same internal dimensions as the shell 20 and rigidly fixed to a frame member (not shown) by means of bolts (not shown) mounted in holes 24. Rotatably mounted within both the stationary shell and the rotating shell is an output drive shaft 25, which has a raised circular center portion 26, on whose peripheral surface there is located a plurality of grooves 27. Both ends of the shaft 25 are supported by bearings 28. Mounted on both ends of the shafts 25 adjacent each bearing 28 are a spacer 29, a spring plate 30, and a cage plate 31. The cage plate 31 has a series of slots 32, which correspond to the grooves 27. The cage plate 31 has also a circular cutout portion 33, which fits over a similar extension 34, located on the ends of the center portion 26 of the output shaft 25. The spring plate 30 has a square cutout portion 35, which fits over a square extension 36, located adjacent the extension 34 of the output shaft 25. The spring plate 30 consists of four arms 37 joined together, the end of each arm being connected to one end of a spring 38. The other end of the spring 38 is connected to a stud 39, mounted on the cage plate 31. As will be described more fully hereinafter, the spring 38 transmits a preferred position to the cam members, thus allowing the output shaft 25 to be driven by the input shaft 21.

Positioned between the inside surfaces of both the rotating shell 20 and the stationary shell 23 and the grooves 27 of the output shaft 25 are a plurality of sets of cam members 40, 41, rigidly mounted on a rod 42. Each of the cam members 40 has a heel portion 43, which fits within one of the grooves 27 of the output shaft, and a front cam surface 44, which is a portion of a true radius whose center is displaced to one side of the rod 42. This latter cam surface is positioned adjacent the stationary shell 23. The cam member 41 has a similar heel portion 43 and a cam surface 45, which is a portion of a true radius whose center is displaced to the opposite side of the rod 42 from that of the radius of the surface 44 of the cam member 40. Each end of the rod 42 is positioned within one of the slots 32 of the cage plates 31.

Mounted between the rotating shell 20 and the stationary shell 23 is a ring-type control plate 46, having a series of slots 77 located on its inner peripheral surface. The slots engage the center portion 73 of the rod 42 of each set of cam members.

In the operation of the clutch-brake apparatus, the springs 38 of the spring plates 30, acting on the cage plates 31 through the studs 39, rotate the cage plates counter-clockwise as indicated by the arrow in FIG. 1. The rotation of the shell 20 is in the opposite direction. Since both cage plates engage the rod 42 of each set of cam members, the cam members 40, 41 are rotated about their heel portions 43 in a similar, counter-clockwise, direction. This action is represented diagrammatically in FIG. 2, in which the movement of the cage plates appears in a clockwise direction. The counter-clockwise rotation of the cam members 40, 41 forces a portion of the cam surface 45 of the cam member 41 to engage the inside surface of the rotating shell 20. This action transmits the rotational forces of the shell 20 to the output shaft 25, thus driving the shaft in the same direction as the rotating shell 20 and the input shaft 21.

Figure 2:
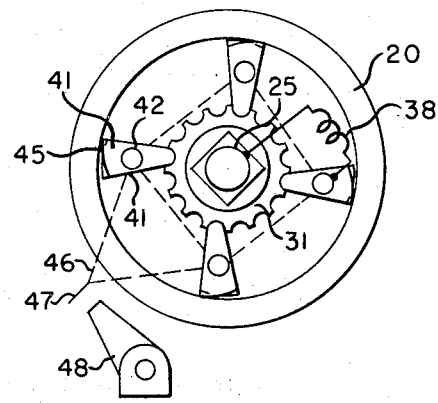
FIG. 2 is a schematic representation of the bottom end view of the clutch-brake mechanism of FIG. 1, illustrating a clutch in a driving relationship with one set of cams wedged between the rotating shell and the output shaft.
Figure 3:
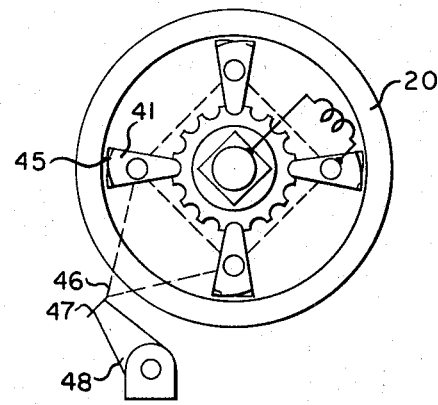
FIG. 3 is a schematic representation of the end view of the clutch-brake mechanism of FIG. 1, illustrating the clutch in an intermediate condition, with both sets of cams disengaged from the rotating shell.
Figure 4:
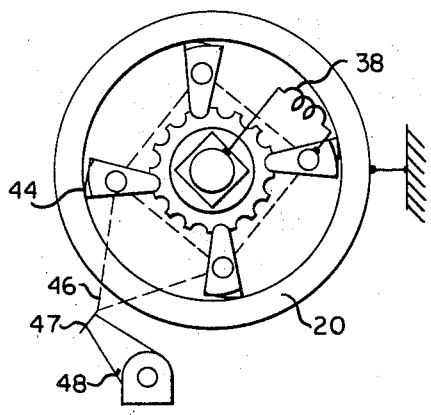
FIG. 4 is a schematic representation of the end view of the clutch-brake mechanism of FIG. 1, illustrating the clutch in a braked condition, with the second set of cams wedged between the stationary shell and the output shaft.

The control plate 46 (FIG. 2) is represented as having an extension 47, which, during the operation of the clutch, is engaged by a latch member 48 or some other device which may be selectively operated to be positioned in the path of the extension 47. As shown in FIGS. 3 and 4, the stopping of the control plate 46 by the latch 48 results in the clockwise rotation of the cams 40, 41 about their heel portions 43. This movement of the cams releases the cam 41 from engagement with the rotating shell 20 while moving the cam surfaces 44 of the cams 40 into engagement with the stationary shell 23. Stopping of the cam 40 results in the stopping of the output shaft 25. It will be seen from this construction that a very small force on the control plate 46 will move the control plate in the direction to release one set of the cam members, thus interrupting the driving condition of the clutch.

This disengagement of the cam 41 from the output shaft 25 is aided by the rotational movement of the output shaft. When the control plate 46 is constrained, by either a friction device, an interposer, or the like, with the resulting stopping of the plate, the output shaft 25 continues to rotate in the preferred counter-clockwise direction (FIG. 2), thereby causing an apparent lag or shift of the control plate 46 relative to the output shaft, which in effect causes the disengagement of the cam surfaces 45 from the rotating shell 20. It will also be seen that this disengagement of the cam 41 is also facilitated by the minimum amount of surface contact that exists between the curved surfaces 44, 45 of the cam members 40, 41 and the shells 20, 23 when the surfaces are engaged. This condition is illustrated in FIGS. 2 and 4.

During this relative shift of the control plate 46, the springs 38 are tensioned, due to the shift of the cage plates 31. Unlatching or unclamping of the control plate 46 permits the tension in the springs to re-establish the attitude of the cage plates and the cam members from a halted condition to a driven condition for the output shaft. It will be seen that the forces necessary to initiate a declutching of the output shaft need only be equal to that necessary to overcome the break-away force of the cam surface bearing on the inner surface of the rotating shell, to arrest the inertia force exerted by the control plate 46, the cams 40, 41 and the cage plates 31, and to change the complement of the springs 38. To restore the device to a driving state, the springs 38 need only overcome the above-cited break-away force and the inertia forces. It is thus evident that a small force exerted at the control plate will control a substantially larger force (load) applied to the output shaft 25, and, further, any reduction forces utilized in halting the output shaft 25 will not be reflected back to the constantly-rotating input shaft 21 but will be reflected back only to the stationary shell 23. Any suitable means, such as bands, clamps, friction shoes, detents, etc., can be utilized to exert the necessary forces on the control plates.

Because of the compact construction and the rigid connection between the various elements of the clutch, the inherent natural frequency of the unit is much higher than any designed frequency of operation to which the clutch may be subjected. Due to the fact that both sets of cam members are connected only by the rod 42, the disengagement of one set of cams will not affect the engagement of the other set of cams. Thus the torque being transmitted through one set of cams will not be reflected back into the clutch through the other set of engaging cams.

Referring now to FIG. 5, there is shown an exploded assembly view of the second embodiment of this invention. Included in this assembly are a rotating shell 75, an input shaft 76, pinned to said rotating shell 75, and a stationary shell 49 mounted in a manner similar to the stationary shell 23, previously described.

Rotatably supported within the shells by a bearing 50 is an output shaft 51, which has a square portion 52 at both ends, a spacer portion 53 at one end, and a raised hexagonal center section 54, consisting of a number of flat surfaces 66, 67. Positioned between the shells 75 and 49 are a control detent 56 and a control spider 57. The control spider 57 has a series of spacer arms 58 projecting outwardly from both sides of the spider. Both the spider 57 and the detent 56 are resiliently connected by a number of springs 59, mounted between a stud 60, supported by the spider 57, and a stud 61, supported by the detent 56. When the detent and the spiders are mated, the studs 60 project through a series of cut-outs 62, located in the detent 56. As will be described more fully hereinafter, the detent 56 has a stop surface 63, which, when engaged by an intercepting element, will stop the detent. This action is transmitted through the springs 59 to the spider 57, thereby stopping the spider.

Associated with the spacer arms 58 and located between the flat surfaces 66, 67 of the output shaft 51 and the shells 75, 49 are two sets of rollers 64 and 65. The first set of rollers 64 is positioned between the flat surfaces 67 of the output shaft and the stationary shells 49, while the second set of rollers 65 is positioned between the flat surfaces 66 of the output shaft and the rotating shell 75. The flat surfaces 66 (FIG. 5) are offset with respect to the corresponding flat surfaces 67 (FIG. 5) of the output shaft located on the other end. This is better shown in FIG. 7, where the surfaces 66, solid line, are contrasted with the surfaces 67, outlined in dotted line.

Mounted on one end of the output shaft 51 is a bias plate 68, which functions as a spacer element for that end of the output shaft. The bias plate has, mounted on one of its sides, a pair of oppositely-positioned studs 69, one of which is shown in FIG. 5. These studs have a diameter equal to that of the roller 65. The studs are positioned between the spacer arms 58 of the spider 57. The rollers 65 which are normally located within the same spacer arm have their length shortened to accommodate the studs. Mounted on the other side of the bias plate 68 is a second pair of studs (not shown). A pair of springs (not shown) is connected between these studs and a pair of studs 70 mounted on the spring plate 71, which has a square cut-out portion 72, thereby allowing the spring plate to be positioned on the square end portion 52 of the output shaft 51. The function of the springs connected to the studs 70 of the spring plate is to rotate the bias plate 68 clockwise, as viewed in FIG. 5, looking in the direction towards the stationary shell 49. This is indicated by the arrow in FIG. 5. This rotation of the bias plate is transferred to the spider 57 by the studs 69 acting on the spacer arms 58.

The clockwise rotation of the spacer arm 58 moves the rollers 65 until they are wedged between the inside surfaces of the rotating shell 75 and the flat surfaces 66 of the output shaft (FIG. 7). This results in the driving of the output shaft 51 by the rotating shell 75. When the clutch is in this position, the rollers 64 are in a non-engaging position, or free state, due to the offset position of the flat surfaces 67. This condition is shown in FIG. 6. The bias plates of the two embodiments disclosed herein are one example of exerting a pressure on the cam members to establish a preferred state of the clutch mechanism. It is obvious that other means, including electrical and magnetic means, may be utilized to accomplish the same result.

When an intercepting element engages the stop surface 63 of the control detent 56, the detent will stop. The stopping action of the detent is transmitted by the springs 59 to the control spider 57. The function of the springs 59 is to absorb the shock of the engagement of the intercepting element with the stop surfaces 63 of the control detent 56. The stopping of the control spider 57 results in the releasing of the rollers 65 from engagement between the output shaft and the rotating shaft, due to the action of the spacer arm 58 on the roller 65. This same action of the spacer arms 58 rotates the rollers 64 into engagement with the inside surfaces of the stationary shell 49 and the flat surfaces 67 of the output shaft, thereby stopping the output shaft. Thus it will be seen that the operation of this clutch from driving the output shaft 51 to the stopping of the shaft 51 is the same as the embodiment disclosed in FIGS. 1 to 4 inclusive. The forces necessary to initiate the clutching of the output shaft 51 are the same as those described with relation to the output shaft of the clutch previously described in connection with FIGS. 1 to 4 inclusive.

Both of the embodiments described herein may have the stationary shell replaced by a shell rotating in the direction opposite to the first-mentioned rotating shell. This results in the clutch's acting as a reversing mechanism, in that the output shaft will have its rotation reversed each time the clutch is operated.

The clutch mechanism of the present invention is designed for use in a high-speed card printer, wherein cards are moved into a printing position, stopped for a printing operation to occur, and then moved out of the printing position. The present clutch configuration has attained a conservative cycling speed of 1,200 operations per minute.

While there have been shown, described, and pointed out the fundamental novel features of the invention as applied to the preferred embodiments, it will be understood that various omissions, substitutions, and changes in the form and details of the device illustrated in the operation may be made by those skilled in the art without departing from the spirit of the invention. It is the intention, therefore, to be limited only as indicated by the scope of the following claims.

What is claimed is:
1. A mechanical clutch apparatus comprising
 (a) a rotatably supported driving member;
 (b) a stationary member mounted in coaxial relation with said driving member;
 (c) a driven member mounted within both of said driving and stationary members;
 (d) means for rotatably supporting said driven member in spaced relation to said driving and stationary members;
 (e) a first set of torque-transmitting elements rotatably mounted between said driving and driven members for coupling said driving member to said driven member when moved to a first position;
 (f) a second set of torque-transmitting elements rotatably mounted between said driven and stationary members for coupling said driven member to said stationary member when moved to a second position;
 (g) positioning means located between each set of torque-transmitting elements and engaging corresponding elements of each set, said positioning means being adapted for rotational movement, said means moving the first set of torque-transmitting elements to said first position while disabling the second set of torque-transmitting elements from said second position when rotated in one direction and moving said second set of torque-transmitting elements into said second position while disabling said first set from said first position when rotated in the opposite direction;
 (h) first control means normally engaging said positioning means to rotate said positioning means in a direction whereby said first set of torque-transmitting elements are moved to said first position, thereby allowing said driving member to drive said driven member;
 (i) and second control means engaging said positioning means and selectively operated to rotate said positioning means in a direction whereby said second set of torque-transmitting elements are moved to said second position, thereby allowing said stationary member to stop said driven member.

2. The clutch of claim 1 in which
 (a) said driven member comprises an output shaft having a series of grooves on its peripheral surface intermediate its ends;
 (b) said torque-transmitting elements comprise wedge-shaped cams having one end rounded and positioned within one of said grooves, the other end of the cams comprising a cam surface engaging one of said members;
 (c) said positioning means includes a plurality of rod members each connecting and supporting corresponding cams of both sets;
 (d) and said first control means includes resilient means connected between the rod members and said output shaft to normally rotate said rod members in a direction whereby the cam surface of the first set of wedge-shaped cams engages said driving member to drive said output shaft while the cam surface of the second set of wedge-shaped cams is disengaged from said stationary member.

3. The clutch of claim 2 in which the cam surfaces of said wedge-shaped cams are sections of true radii, the cam surface of the first set of cams being offset with relation to the cam surface of the second set of cams.

4. The clutch of claim 2 in which said first control means further includes
 (a) a pair of hollow disc members each rotatably mounted on one end of said output shaft, each disc having a plurality of notches on its outer peripheral edge, each notch engaging the end of one of said rod members;
 (b) a pair of support members each rigidly mounted on said output shaft adjacent said hollow disc members;
 (c) and said resilient means comprising a pair of spring members each mounted between one of said support members and said hollow disc members to rotate said hollow disc in a direction whereby said rod members are rotated to move said first set of wedge-shaped cams into engagement with said driving member.

5. The clutch of claim 2 in which said second control means consists of
   (a) a ring-type member having a plurality of notches on its inner peripheral surface, each of said notches engaging one of said rod members intermediate its ends, said ring-type member being adapted for rotational movement when operated;
   (b) and means for selectively operating said ring-type member whereby said rod members are rotated in a direction to move the cam surfaces of said second set of wedge-shaped cams into engagement with said stationary member to stop said output shaft while disengaging the cam surfaces of said first set of cams from said driving member.

6. The clutch of claim 1 in which:
   (a) said driven member comprises an output shaft member having first and second sets of cam surfaces positioned intermediate its ends;
   (b) said positioning means includes a first ring-type member within which is located said output shaft member, said ring-type member supporting two sets of arms, one set positioned adjacent said first cam surface while the other is positioned adjacent said second cam surface, the corresponding arms of both sets mounted adjacent each first and second cam surface being in coaxial relation with each other;
   (c) each of said torque-transmitting elements comprising a roller member positioned between two of said arms of each set and adjacent one of said cam surfaces;
   (d) and said first control means including resilient means connected between said first ring-type member and said output shaft to rotate said ring member in a direction whereby the first set of rollers is wedged between said driving member and said output shaft to drive said output shaft while said second set of rollers is disengaged from said stationary member.

7. The clutch of claim 6 wherein each of said cam surfaces is offset with relation to the second set of cam surfaces, thereby allowing one set of rollers to be disengaged from said output shaft while the other set of rollers is engaged with said shaft.

8. The clutch of claim 6 wherein said first control means includes
   (a) a first support member rigidly connected to said output shaft;
   (b) a second support member rotatably mounted on said output shaft adjacent said first support member;
   (c) connecting means mounted on said first and second support members engaged by said resilient means to allow said second support member to be rotated by said resilient means;
   (d) and actuating means mounted on said second support member and positioned between two of said arms whereby, upon rotation of said second support means, said first ring-type member is rotated by said actuating means to wedge said first set of rollers between one set of flat cam surfaces of said output shaft and said driving member.

9. The clutch of claim 8 in which said second control means comprises
   (a) a second ring-type member positioned adjacent said first ring-type member and mounted for rotational movement, said second ring-type member having a control surface mounted on its peripheral edge for cooperation with a selectively-operated control member;
   (b) and second resilient means connected between said first and second ring-type members for controlling said first ring-type member when said second ring-type member is selectively operated, whereby the first set of rollers is disengaged from said output shaft and said driving member and the second set of rollers is wedged between the second set of flat cam surfaces of said output shaft and said stationary member to stop said output shaft.

References Cited

UNITED STATES PATENTS

| 1,256,755 | 2/1918 | White | 192—27 |
| 1,927,060 | 9/1933 | Ballard | 192—27 |
| 2,501,198 | 3/1950 | Wagner et al. | 192—17 |
| 2,752,022 | 6/1956 | Harper | 192—12 |
| 2,901,067 | 8/1959 | Nicholson | 192—27 |

CARLTON R. CROYLE, *Primary Examiner.*

C. M. LEEDOM, *Assistant Examiner.*